United States Patent [19]
Maeda

[11] Patent Number: 5,291,563
[45] Date of Patent: Mar. 1, 1994

[54] METHOD AND APPARATUS FOR DETECTION OF TARGET OBJECT WITH IMPROVED ROBUSTNESS

[75] Inventor: Eisaku Maeda, Kanagawa, Japan

[73] Assignee: Nippon Telegraph and Telephone Corporation, Tokyo, Japan

[21] Appl. No.: 805,612

[22] Filed: Dec. 12, 1991

[30] Foreign Application Priority Data

Dec. 17, 1990 [JP] Japan .................................. 2-411144
Jul. 11, 1991 [JP] Japan .................................. 3-170279

[51] Int. Cl.$^5$ .......................... G06K 9/00; G06K 9/20; G06K 9/62; G06K 9/76
[52] U.S. Cl. .......................................... 382/48; 382/1; 382/30; 382/34; 348/135; 348/148; 348/152
[58] Field of Search .................... 382/1, 30, 34, 39, 48; 358/103, 105, 107, 125; G06K 9/00, 9/62, 9/76, 9/20; H04N 7/00

[56] References Cited
U.S. PATENT DOCUMENTS 4,323,880 4/1982 Lucas ..................................... 382/39
5,027,413 6/1991 Barnard ................................. 382/39

*Primary Examiner*—Jose L. Couso
*Attorney, Agent, or Firm*—Oblon, Spivak, McClelland, Maier & Neustadt

[57] ABSTRACT

An object detection system and a state transition detection system capable of realizing the improved robustness, general applicability, and customizability. In the system, features for the target image are calculated, where the features including at least one of a quantity expressing a difference of contributions by principal axis components and secondary axis components in a distribution of brightness of corresponding points in each target area on the target image and the reference image, and a quantity expressing a difference between a direction of a principal axis with respect to a vector (1, 1) direction in the distribution of brightness of corresponding points in each target area on the target image and the reference image; and the calculated features for the target image is classified into a first class corresponding to a presence of the target object and a second class corresponding to an absence of the target by using a classifier, according to which a detection result indicating the presence or absence of the target object is outputted.

24 Claims, 10 Drawing Sheets

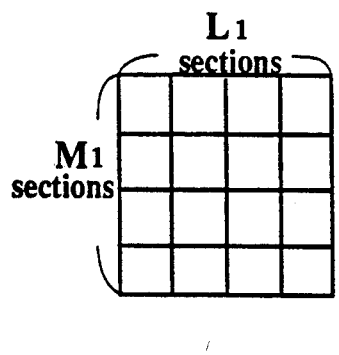
FIG.2A
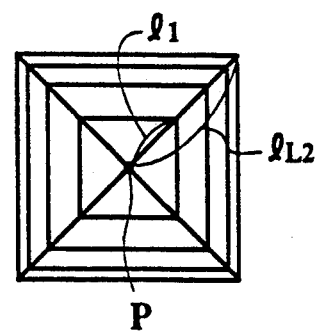
FIG.2B
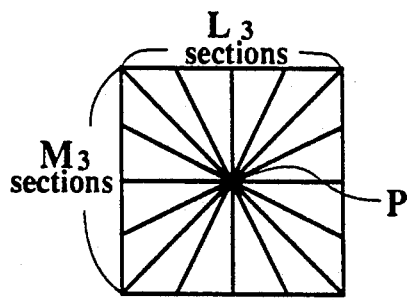
FIG.2C
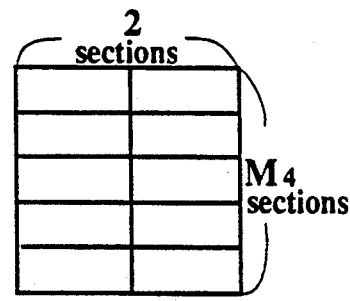
FIG.2D
FIG.3
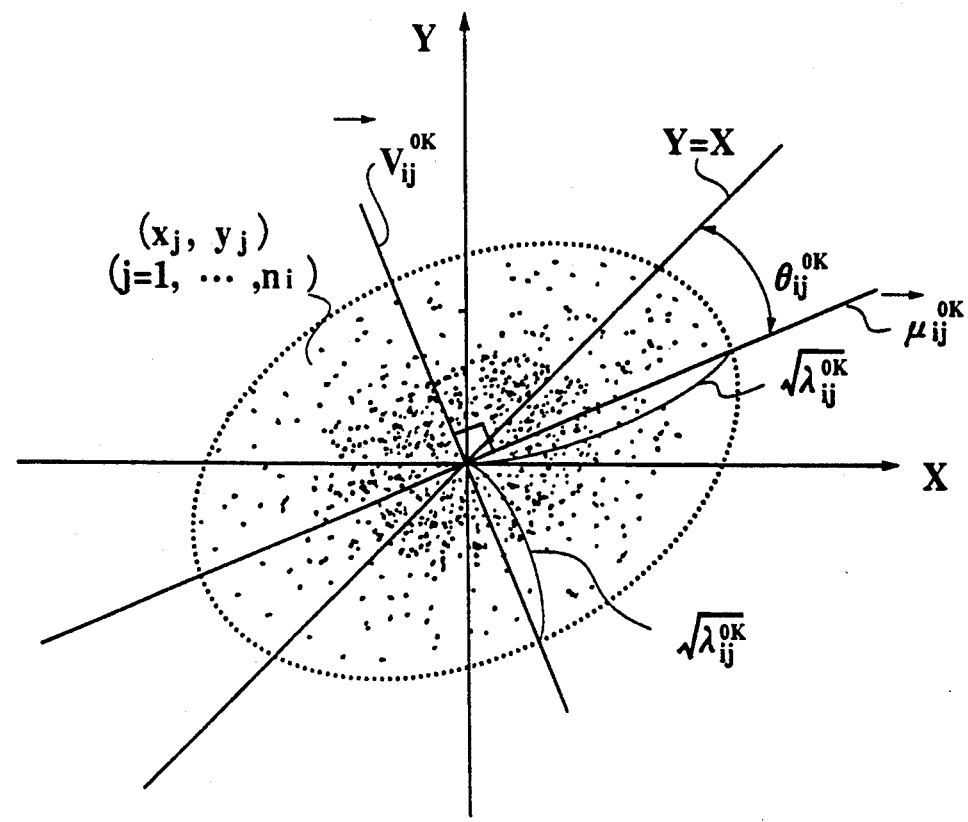

$r \cong 1$
$\Phi^2 \cong 1$
$\Psi^2 = 1$ $r \cong 0$
$\Phi^2 \cong 1$
$\Psi^2 = 0.5$ $r \cong 0$
$\Phi^2 \cong 1$
$\Psi^2 \cong 0.5$ $r \cong 1$
$\Phi^2 \cong 1$
$\Psi^2 \cong 0.5$ $r \cong -1$
$\Phi^2 \cong 1$
$\Psi^2 \cong 0.5$

| 56 | 57 | 58 | 59 | 60 | 61 | 62 | 63 |

| 48 | 49 | 50 | 51 | 52 | 53 | 54 | 55 |
| 40 | 41 | 42 | 43 | 44 | 45 | 46 | 47 |

| 32 | 33 | 34 | 35 | 36 | 37 | 38 | 39 |
| 24 | 25 | 26 | 27 | 28 | 29 | 30 | 31 |

| 16 | 17 | 18 | 19 | 20 | 21 | 22 | 23 |
| 8  | 9  | 10 | 11 | 12 | 13 | 14 | 15 |

| 0 | 1 | 2 | 3 | 4 | 5 | 6 | 7 |

METHOD AND APPARATUS FOR DETECTION OF TARGET OBJECT WITH IMPROVED ROBUSTNESS

BACKGROUND OF THE INVENTION

1. Field of the Invention

The present invention relates to a method and an apparatus for detecting a presence of an object belonging to a prescribed category, in a region defined over the background.

2. Description of the Background Art

Various types of a service using the image data as the inputs are becoming available as a result of the recent advances in the fields of computer and the communication.

Among such a service, the object detection method for detecting a presence of an object in a prescribed region on a basis of an image of the region is the core technique in the following practical applications.

(1) A remote administration support system in which an open space in the parking area or a hall such as a concert hall is detected for the purpose of guiding the customers.

(2) An automatic monitoring system for detecting the occurrence of an abnormality such as an intruding person or object.

(3) An automatic counting system for counting a number of vehicles, persons, or traffic flows.

Now, as a conventional method for detecting an object in a prescribed region on a basis of an image of the region taken from a fixed camera position, the following two methods have been known.

(1) A method in which the presence of the object is estimated by calculating features such as an edge feature or an edge direction obtained from a brightness of the region, or a shape of the object estimated from such features, and then comparing the similar features obtained in advance for the object to be detected.

(2) A method utilizing a mean brightness of the region, a mean brightness of the partitioned regions, or frequency distribution of direction codes in a differential image.

However, these conventional methods are associated with the following problems.

Namely, in the method (1), it is necessary to have a model for the object to be detected in advance. Here, in a case the object to be detected has a specific invariable shape it is possible to devise such a model, but in a case the object to be detected is defined only in terms of a category it belongs to such as a human being or a car, it is difficult to devise a general model applicable to all the objects belonging to the particular category.

In addition, in this method (1), it is further necessary to have the quantities that can be used in characterizing the object to be detected. For example, the difference values and the correlation coefficients have been used as such quantities for characterizing the object to be detected conventionally. However, when these quantities are used to characterize the object to be detected, a satisfactory detection result could not have been obtained under the adverse condition such as a case of detecting a black object in a dark environment or a case of detecting a white object in a bright environment.

On the other hand, the method (2) has been associated with the problems that there is a tendency for the detection result to be affected by the irregular pattern on the background image, the variation of the overall environmental brightness, and the local variation of the brightness.

Generally speaking, the conventional object detection method has been dissatisfactory in the following three points.

(1) A lack of robustness with respect to the environmental variations. The conventional method has been capable of operating properly only at the specific environmental condition for which it is designed to work, so that the detection result could be severely affected by the environmental variations.

(2) A lack of general applicability. The conventional method has been capable of operating only with respect to the specific object to be detected for which it is designed to work, so that the same method was not readily applicable to the detection of other objects.

(3) A lack of customizability. The conventional method has been designed for a specific setting alone, and could not have been adapted to particularities of the other circumstances in which the method may be operated.

Furthermore, as a conventional method for detecting a state transition in a prescribed region on a basis of an image of the region taken by a fixed camera, there has been a method in which the state transition is detected on a basis of the difference of two sequential images.

However, in this method for detection a state transition, a time interval between the two sequential images for which the difference is to be taken must be quite short in order to detect the state transition accurately.

Moreover, in this method for detecting a state transition, it has been difficult to detect a presence of a particular target object along with the state transition.

SUMMARY OF THE INVENTION

It is therefore an object of the present invention to provide a method and an apparatus for object detection capable of realizing the improved robustness, general applicability, and customizability.

It is another object of the present invention to provide a method and an apparatus for state transition detection capable of realizing the improved robustness, general applicability, and customizability, which is also capable of detecting a presence of a particular target object along with the state transition at a high reliability.

According to one aspect of the present invention there is provided an object detection apparatus for detecting a presence of a target object in prescribed target areas on a target image taken from a fixed camera position, comprising: feature calculation means for calculating features for the target image, the features including at least one of a quantity expressing a difference of contributions by principal axis components and secondary axis components in a distribution of brightness of corresponding points in each target area on the target image and a reference image, and a quantity expressing a difference between a direction of a principal axis with respect to a vector (1, 1) direction in the distribution of brightness of corresponding points in each target area on the target image and the reference image, where the reference image is an image taken from said fixed camera position in which the target object is known to be absent; classifier means for classifying the features into a first class corresponding to a presence of the target object and a second class corresponding to an absence of the target by using a classifier; and output means for outputting a detection result indicating the presence of the target object in the prescribed target areas on the target image when the features for the target image are classified into the first class, and the absence of the target object in the prescribed target areas on the target image when the features for the target image are classified into the second class.

According to another aspect of the present invention there is provided a method for detecting a presence of a target object in prescribed target areas on a target image taken from a fixed camera position, comprising the steps of: taking a reference image in which the target object is known to be absent from said fixed camera position; taking the target image from said fixed camera position; calculating features for the target image, the features including at least one of a quantity expressing a difference of contributions by principal axis components and secondary axis components in a distribution of brightness of corresponding points in each target area on the target image and the reference image, and a quantity expressing a difference between a direction of a principal axis with respect to a vector (1, 1) direction in the distribution of brightness of corresponding points in each target area on the target image and the reference image; classifying the features into a first class corresponding to a presence of the target object and a second class corresponding to an absence of the target by using a classifier; and outputting a detection result indicating the presence of the target object in the prescribed target areas on the target image when the features for the target image are classified into the first class, and the absence of the target object in the prescribed target areas on the target image when the features for the target image are classified into the second class.

Other features and advantages of the present invention will become apparent from the following description taken in conjunction with the accompanying drawings.

BRIEF DESCRIPTION OF THE DRAWINGS

FIGS. 2A to 2D are illustrations of possible partitioning patterns to be used at an area partition unit of the object detection system of FIG. 1.

FIG. 3 is a plot of a distribution of brightness of corresponding points on a normalized reference image and a normalized target image, for illustrating meanings of the normalized principal component features to be used at a feature calculation unit of the object detection system of FIG. 1.

FIGS. 4A to 4H are plots of a distribution of brightness of corresponding points on a normalized reference image and a normalized target image, for various exemplary cases.

DETAILED DESCRIPTION OF THE PREFERRED EMBODIMENTS

Figure 1:
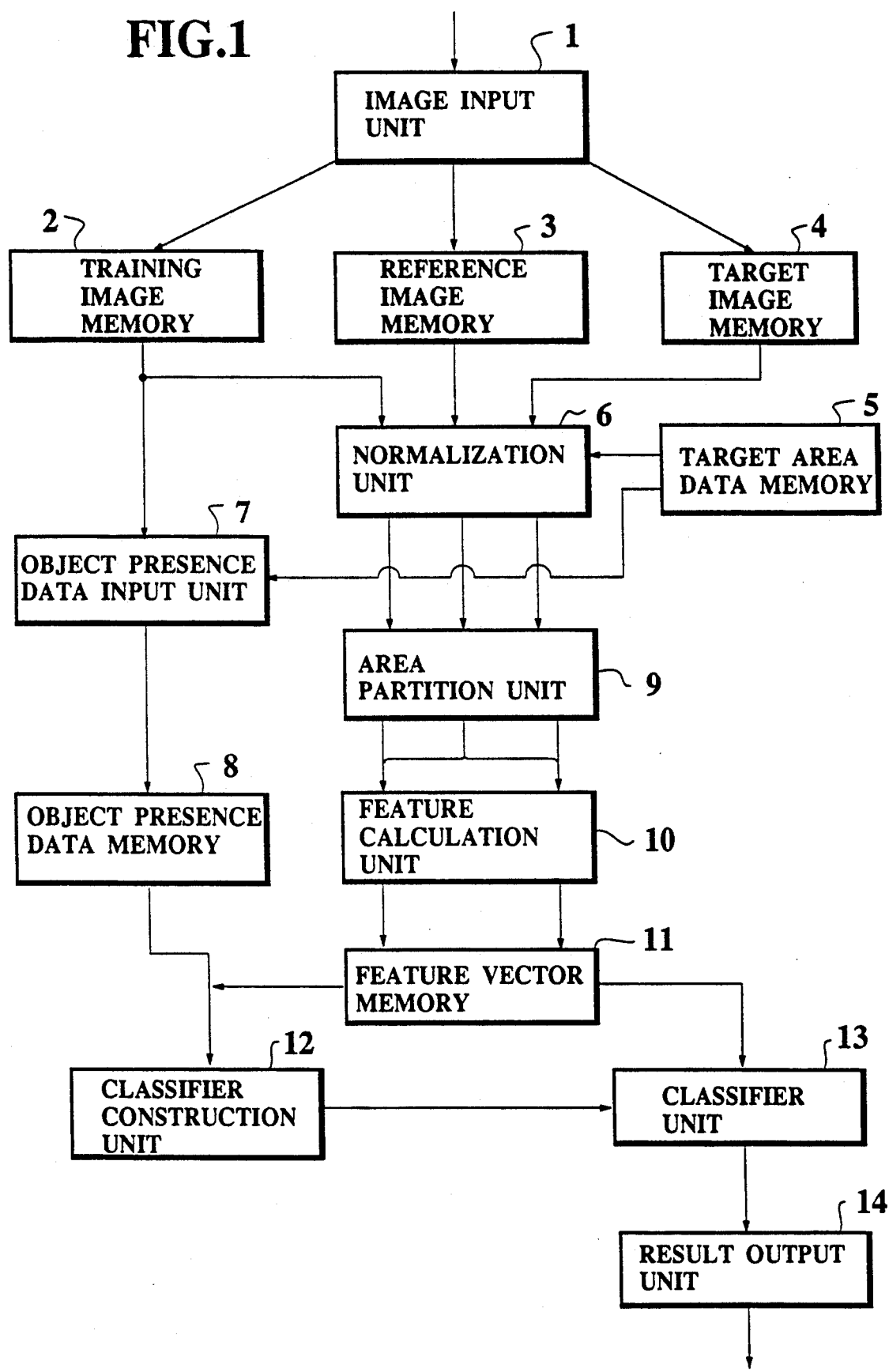
FIG. 1 is a block diagram of a first embodiment of an object detection system according to the present invention.

Referring now to FIG. 1, a first embodiment of an object detection system according to the present invention will be described in detail.

In this first embodiment, the object detection system comprises: an image input unit 1 for inputting images to be processed in the system; a training image memory 2 for storing training images inputted from the image input unit 1; a reference image memory 3 for storing a reference image inputted from the image input unit 1; a target image memory inputted from the image input unit 1; a target image memory 4 for storing target images inputted from the image input unit 1; a target area data memory 5 for storing a target area data indicating target areas in which a target object is to be detected by the system; a normalization unit 6 for normalizing the brightness in the images stored in the image memories 2, 3 and 4 to obtain the normalized images; a training object presence data input unit 7 for inputting object presence data indicating the already known presence or absence of the target object within the target areas in the training images; an object presence data memory 8 for storing the inputted object presence data as teacher data for a training process; an area partition unit 9 for dividing each of the target areas in the normalized images into partitions; a feature calculation unit 10 for calculating features from the brightness in each of the partitions; a feature vector memory 11 for storing a feature vector by arranging the features calculated by the feature calculation unit 10 in a predetermined order assigned to the partitions; a classifier construction unit 12 for constructing a classifier for classifying the presence and the absence of the target object in the target areas by using the object presence data stored in the object presence data memory 8 and the feature vector in the feature vector memory 11 obtained from the training images and the reference image; a classifier unit 13 for applying the constructed classifier to the feature vectors obtained from the reference image and target images in order to obtain a classification result indicating the presence or absence of the target object in the target areas; and a result output unit 14 for outputting the obtained classification result as the detection result obtained by the system.

In this object detection system, three types of images including the training image, reference image, and target image are used. The target image is an actual image taken from a fixed camera position in which the presence or absence of the target object is to be determined by the system. The reference image is a purely background image taken from the same fixed camera position from which the target image is to be taken, in which it is known that there is no target object presence. The training image is an image to be used in a training process, which is taken from the same camera position from which the target image is to be taken, in which the presence or absence of the target object is already known.

On each of these training images, reference image, and target images, the normalization of the brightness is carried out at the normalization unit 6 such that the mean and variance of the brightness within the target areas become uniform in the resulting normalized images.

More specifically, this normalization is carried out as follows.

Namely, by expressing a position on an image by a vector x, a set of position vectors for pixels in the i-th area on the image by $A_i$, a number of pixels contained within the i-th area on the image by an integer $N_i$, and brightness of the reference image, training image, and target image by $g_0(x)$, $g_1(x)$ and $g_2(x)$, respectively, the brightness value $N(g_k(x))$ of the pixel at the position x belonging to $A_i$ in the normalized image can be given by:

$$N(g_k(x)) = \frac{g_k(x) - \mu_i^k}{\sigma_i^k} \quad (x \in A_i) \tag{1}$$

where $\mu$ and $\sigma$ are the mean and variance of the i-th area on the image before the normalization, respectively, which are defined as:

$$\mu_i^k = \frac{1}{N_i} \sum_{x \in A_i} g_k(x) \tag{2}$$

and $$\sigma_i^k = \frac{1}{N_i} \sum_{x \in A_i} (g_k(x) - \mu_i^k)^2 \tag{3}$$

where $N_i$ is a number of pixels in the i-th area.

Here, it is to be noted that the mean $\tilde{\mu}_i^k$ and the variance $\tilde{\sigma}_i^k$ of the brightness in each area of the normalized image take the definite values of 0 and 1, respectively, as follows.

$$\tilde{\mu}_i^k = \frac{1}{N_i} \sum_{x \in A_i} N(g_k(x)) = 0 \tag{4}$$

and $$\tilde{\sigma}_i^k = 1 \tag{5}$$

where $$\begin{cases} k = 0, 1, 2 \\ i = 1, -, N_A \end{cases} \tag{6}$$

where $N_A$ is a number of target areas on the image under the consideration.

Next, on each of the normalized images obtained by the normalization unit 6, the partitioning of each of the target areas in the normalized images into the partitions is carried out at the area partition unit 9.

Here, the partitioning can be carried out in any one of various possible manners including the examples for a case of a rectangular region shown in FIGS. 2A to 2D.

In an example of FIG. 2A, the partitions are obtained by dividing each of the horizontal sides of a rectangle into $L_1$ equivalent sections and each of the vertical sides of a rectangle into $M_1$ equivalent sections, and joining the mutually facing dividing points by a line segment, such that a number of partitions $N_p$ in this case is given by:

$$N_p = L_1 \times M_1 \tag{7}$$

In an example of FIG. 2B, the partitions are obtained by dividing a rectangle by diagonal lines, dividing each line segment between an intersection P of the diagonal lines and each corner of a rectangle into $L_2$ section in which the i-th section $l_i$ has a length given by:

$$l_i = \sqrt{(i/L_2)} \times l_{L_2} \tag{8}$$

where $l_{L_2}$ is a length of a line segment between the intersection P of the diagonal lines and each corner of a rectangle, and the length of the i-th section $l_1$ is defined to make the area of each partition approximately equal to that of the other partition, and then joining the mutually facing dividing points by a line segment, such that a number of partitions $N_P$ in this case is given by:

$$N_p = 4 \times L_2 \tag{9}$$

In an example of FIG. 2C, the partitions are obtained by dividing each of the horizontal sides of a rectangle into $L_3$ equivalent sections and each of the vertical sides of a rectangle into $M_3$ equivalent sections, and joining each dividing point and an intersection P of the diagonal lines by a line segment, such that a number of partitions $N_P$ in this case is given by:

$$N_p = L_3 \times M_3 \tag{10}$$

In an example of FIG. 2D, the partitions are obtained by dividing each of the horizontal sides of a rectangle into two equivalent sections and each of the vertical sides of a rectangle into $M_4$ equivalent sections, and joining the mutually facing dividing points by a line segment, such that a number of partitions $N_p$ in this case is given by:

$$N_p = 2 \times M_4 \tag{11}$$

Next, for each of the partitions in the normalized images, the prescribed types of features are calculated by the feature calculation unit 10, and the calculated features are arranged in a predetermined order assigned to the partitions in order to yield the feature vector at the feature vector memory 11.

More specifically, the features to be used in this embodiment are given as follows.

Namely, by expressing a set of position vectors for pixels in the j-th partition of the i-th area on the image by $R_{i,j}$, a number of pixels contained within the j-th partition of the i-th area on the image by an integer $N_{i,j}$, where $i = 1, 2, \ldots, N_A$, and $j = 1, 2, \ldots, N_R$, the mean and variance of the brightness in the j-th partition of the i-th area on the image before the normalization can be given by:

$$\mu_{ij}^k = \frac{1}{N_{ij}} \sum_{x \in R_{ij}} g_k(x) \ (k = 0, 1, 2) \tag{12}$$

and $$\sigma_{ij}^{kl} = \frac{1}{N_{ij}} \sum_{x \in R_{ij}} \{(g_k(x) - \mu_{ij}^k)(g_l(x) - \mu_{ij}^l)\} \tag{13}$$

$(k, l = 0, 1, 2)$ respectively, while the mean and variance of the brightness in the j-th partition of the i-th area on the normalized image can be given by:

$$\tilde{\mu}_{ij}^k = \frac{1}{N_{ij}} \sum_{x \in R_{ij}} N(g_k(x)) \ (k = 0, 1, 2) \tag{14}$$

and $$\tilde{\sigma}_{ij}^{kl} = \frac{1}{N_{ij}} \sum_{x \in R_{ij}} \{(N(g_k(x)) - \tilde{\mu}_{ij}^k) \times (N(g_l(x)) - \tilde{\mu}_{ij}^l)\} \tag{15}$$

$(k, l = 0, 1, 2)$ respectively.

Then, the features called the normalized principal component features are defined by the present inventors as at least one of a quantity expressing a difference of contributions by the principal axis components and the secondary axis components in the distribution of the brightness of corresponding points in each target area on the normalized reference image and the normalized target image, and a quantity expressing a difference between a direction of the principal axis with respect to a vector (1, 1) direction in the distribution of the brightness of corresponding points in each target area on the normalized reference image and the normalized target image.

For example, the normalized principal component features can be given by:

$$\Phi_{ij} = \frac{\sqrt{\beta_{ij}^{\phi k}}}{\alpha_{ij}^{\phi k}} \ (k = 1, 2) \tag{16}$$

and $$\Psi_{ij} = \begin{cases} \left(\frac{1}{2} + \frac{\gamma_{ij}^{\phi k}}{\sqrt{\beta_{ij}^{\phi k}}}\right)^{\frac{1}{2}} & \text{when } \beta_{ij}^{\phi k} \neq 0 \\ \sqrt{1/2} & \text{when } \beta_{ij}^{\phi k} = 0 \end{cases} \tag{17}$$

$(k = 1, 2)$ where $$\alpha_{ij}^{pk} = \tilde{\sigma}_{ij}^{p0} + \tilde{\sigma}_{ij}^{kk} \ (k=1, 2) \tag{18}$$

$$\beta_{ij}^{0k} = (\tilde{\sigma}_{ij}^{00} - \tilde{\sigma}_{ij}^{kk})^2 + 4(\tilde{\sigma}_{ij}^{0k})^2 \ (k=1, 2) \tag{19}$$

$$\gamma_{ij}^{pk} = \tilde{\sigma}_{ij}^{pk} (k=1, 2) \tag{20}$$

These normalized principal component features $\Phi$ and $\Psi$ of the equations (16) and (17) can be re-expressed by considering the distribution of points $(x_j, y_j)$, where $j=1, \ldots, N_i$) in two-dimensional space shown in FIG. 3, where X axis represents a brightness value in the j-th partition of the i-th area on the normalized target image, and Y axis represents a brightness value in the j-th partition of the i-th area on the normalized reference image. In FIG. 3, vectors u and vector v represent the directions of the principal axis and the secondary axis when the principal component analysis is applied to this distribution.

Now, when the angle between the direction of the principal axis represented by the vector u and the direction of the (1,1) vector represented by a line Y=X is denoted by $\theta$, and the eigen values corresponding to the vectors u and v are denoted by $\lambda$ and $\tilde{\lambda}$, the normalized principal component features $\Phi$ and $\Psi$ of the equations (16) and (17) can be re-expressed as follows:

$$\Phi_{ij} = \frac{\lambda_{ij}^{\phi k} - \tilde{\lambda}_{ij}^{\phi k}}{\lambda_{ij}^{\phi k} + \tilde{\lambda}_{ij}^{\phi k}} \ (k = 1, 2) \tag{21}$$

and $$\Psi_{ij} = \cos \theta_{ij}^{\phi k} \ (k = 1, 2) \tag{22}$$

Here, the feature $\Phi$ defined by the equation (21) evaluates the distribution linearity, so that $\Phi=0$ when the distribution is isotropic and $\Phi=1$ when the distribution lies on a line, while the feature $\Psi$ defined by the equation (22) evaluates the distribution direction, so that $\Psi=0$ when the direction of the principal axis of the distribution is $(1, -1)$ and $\Psi=1$ when the direction of the principal axis of the distribution is $(1, 1)$. If the normalized target image and the normalized reference image are identical, all the points lie on the line Y=X, so that both of these normalized principal component features becomes equal to 1, i.e., $\phi=\psi=1$.

Now, with references to FIGS. 4A to 4H, it will be discussed that the normalized principal component features $\Phi$ and $\Psi$ defined above are advantageous with respect to the conventionally utilized features such as Pearson correlation coefficient for the distribution of the brightness of corresponding points in each target area on the normalized reference image and the normalized target image, which are defined by the following equation (23).

$$r = \begin{cases} 0 & \text{when } \sigma_{ij}^{\phi\phi} \cdot \sigma_{ij}^{kk} = 0 \\ \frac{\tilde{\sigma}_{ij}^{\phi k}}{(\tilde{\sigma}_{ij}^{\phi\phi} \tilde{\sigma}_{ij}^{kk})^{\frac{1}{2}}} = \frac{\sigma_{ij}^{\phi k}}{(\sigma_{ij}^{\phi\phi} \sigma_{ij}^{kk})^{\frac{1}{2}}} & \text{otherwise} \end{cases} \tag{23}$$

$(k = 1, 2)$

Namely, each of FIGS. 4A to 4H shows the two-dimensional space similar to that shown in FIG. 3, where X axis represents a brightness value in the j-th partition of the i-th area on the normalized target image, and Y axis represents a brightness value in the j-th partition of the i-th area on the normalized reference image, and in which the bold arrow indicates the direction of the principal axis of the distribution, and the squared values for the normalized principal component features $\Phi$ and $\Psi$ of the equations (21) and (22) and the value for the Pearson correlation coefficient r of the equation (23) are indicated along with the figures.

As can be seen from FIGS. 4A to 4H, the normalized principal component features $\Phi^2$ and $\Psi^2$ take the values different from the Pearson correlation coefficient r. This difference of the values taken by the normalized principal component features and the Pearson correlation coefficient has the following significance in the object detection.

Figure 4A:
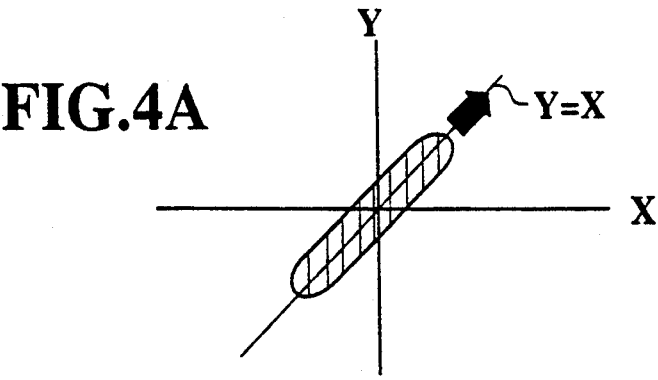
Figure 4B:
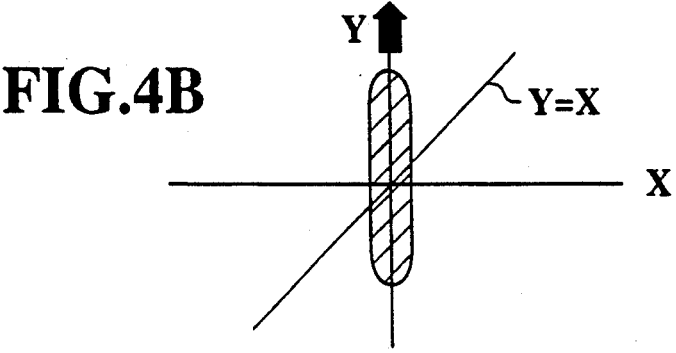
Figure 4C:
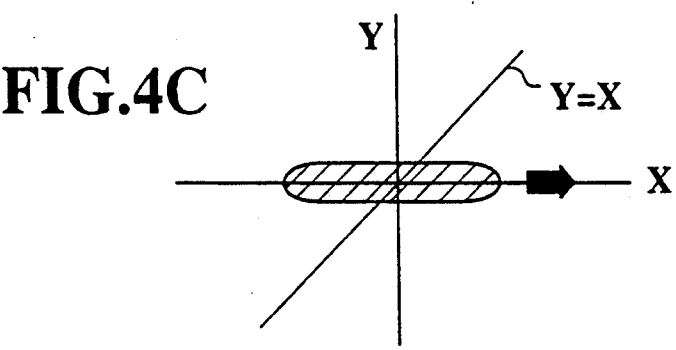

For example, when a relatively uniform target object is present on an irregular background, the distribution becomes as shown in FIG. 4B, for which r=0, $\Phi^2 \approx 1$, and $\Phi^2=0.5$. If there is no object, $r \approx 1$, $\Phi^2 \approx 1$, and $\Psi^2 \approx 1$ as shown in FIG. 4A, so that FIG. 4B is correctly indicating the presence of the target object for both the normalized principal component features and the Pearson correlation coefficient.

Figure 4D:
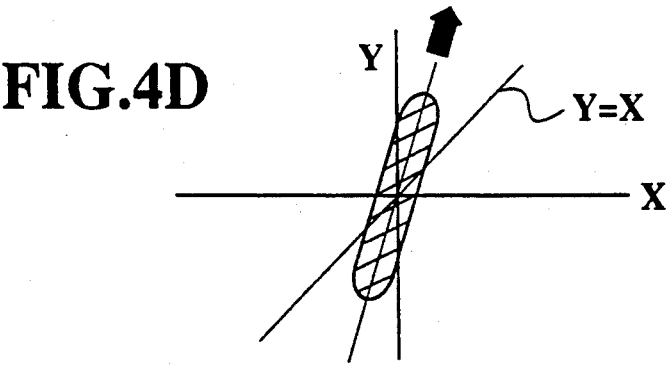
Figure 4E:
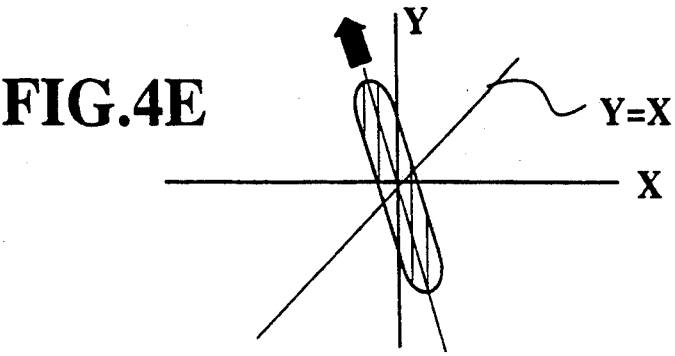
Figure 4F:
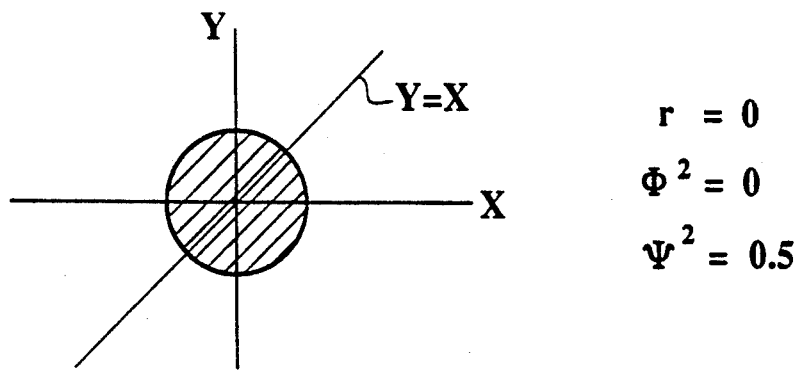
Figure 4E:
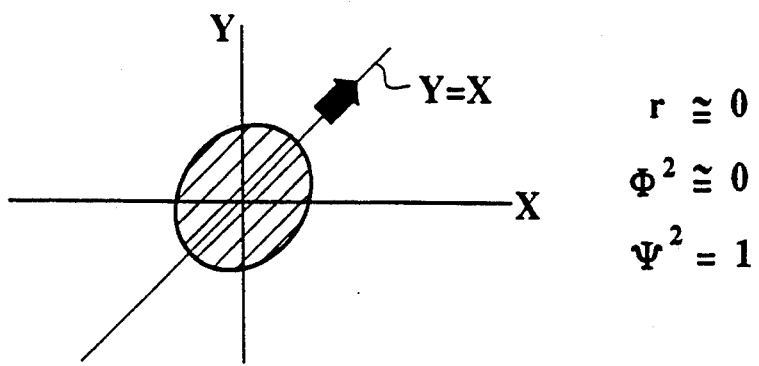
Figure 4H:
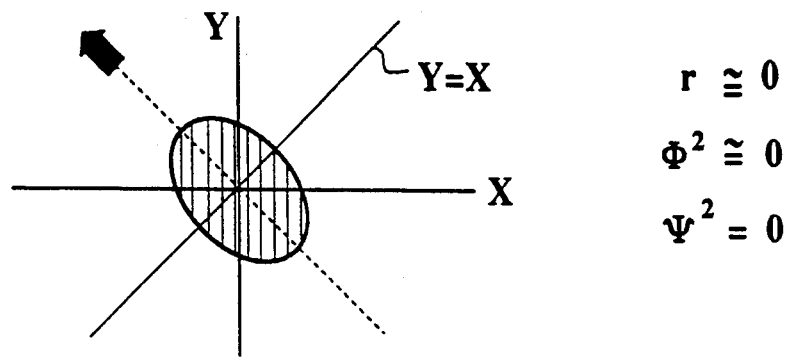

However, when the principal axis of the distribution is slightly inclined by the influence of noises as shown in FIG. 4D or FIG. 4E, for which $r \approx \pm 1$, $\Phi^2 \approx 1$, and $\Psi^2 \approx 0.5$, so that the values of the normalized principal component features $\Phi$ and $\Psi$ are stable with respect to the slight variations and capable of detecting the presence of the target object correctly, whereas the value of the Pearson correlation coefficient is so severely affected by the slight variations that the presence of the target object cannot be detected correctly in the presence of the slight variations.

It is to be noted that the features of the forms other than those expressed in the equations (16) and (17), or (21) and (22) may be used similarly, instead of the normalized principal component features defined above.

For example, the following quantities can be used as a quantity expressing a difference of contributions by the principal axis components and the secondary axis components in the distribution of the brightness of corresponding points in each target area on the normalized reference image and the normalized target image, instead of $\Phi$ defined by the equation (16) or (21).

$$(1)\ 1 - \frac{(\lambda\tilde{\lambda})^{\frac{1}{2}}}{\lambda + \tilde{\lambda}} \quad (24)$$

$$(2)\ \frac{\lambda}{\lambda + \tilde{\lambda}} \quad (25)$$

$$(3)\ \frac{\tilde{\lambda}}{\lambda} + \frac{\lambda}{\tilde{\lambda}} \quad (26)$$

$$(4)\ \frac{\lambda + \tilde{\lambda}}{(\lambda\tilde{\lambda})^{\frac{1}{2}}} \quad (27)$$

In addition, any linear sum or a product forms obtained from quantities defined in the equations (21) and (24) to (27) may also be used.

Moreover, more than one of these possible quantities may also be used simultaneously.

Similarly, the following quantities can be used as a quantity expressing a difference between a direction of the principal axis with respect to a vector (1, 1) direction in the distribution of the brightness of corresponding points in each target area on the normalized reference image and the normalized target image, instead of $\Psi$ defined by the equation (17) or (22).

$$(1)\ |\theta| \quad (28)$$

$$(2)\ |\cos h\theta| \quad (29)$$

$$(3)\ \theta \arctan \frac{1}{\theta} \quad (30)$$

In addition, any linear sum or a product forms obtained from quantities defined in the equations (22) and (28) to (30) may also be used.

Moreover, more than one of these possible quantities may also be used simultaneously.

It is to be noted that any one or any combinations of these quantities enumerated above can be used as the features in the present invention.

Figure 5:
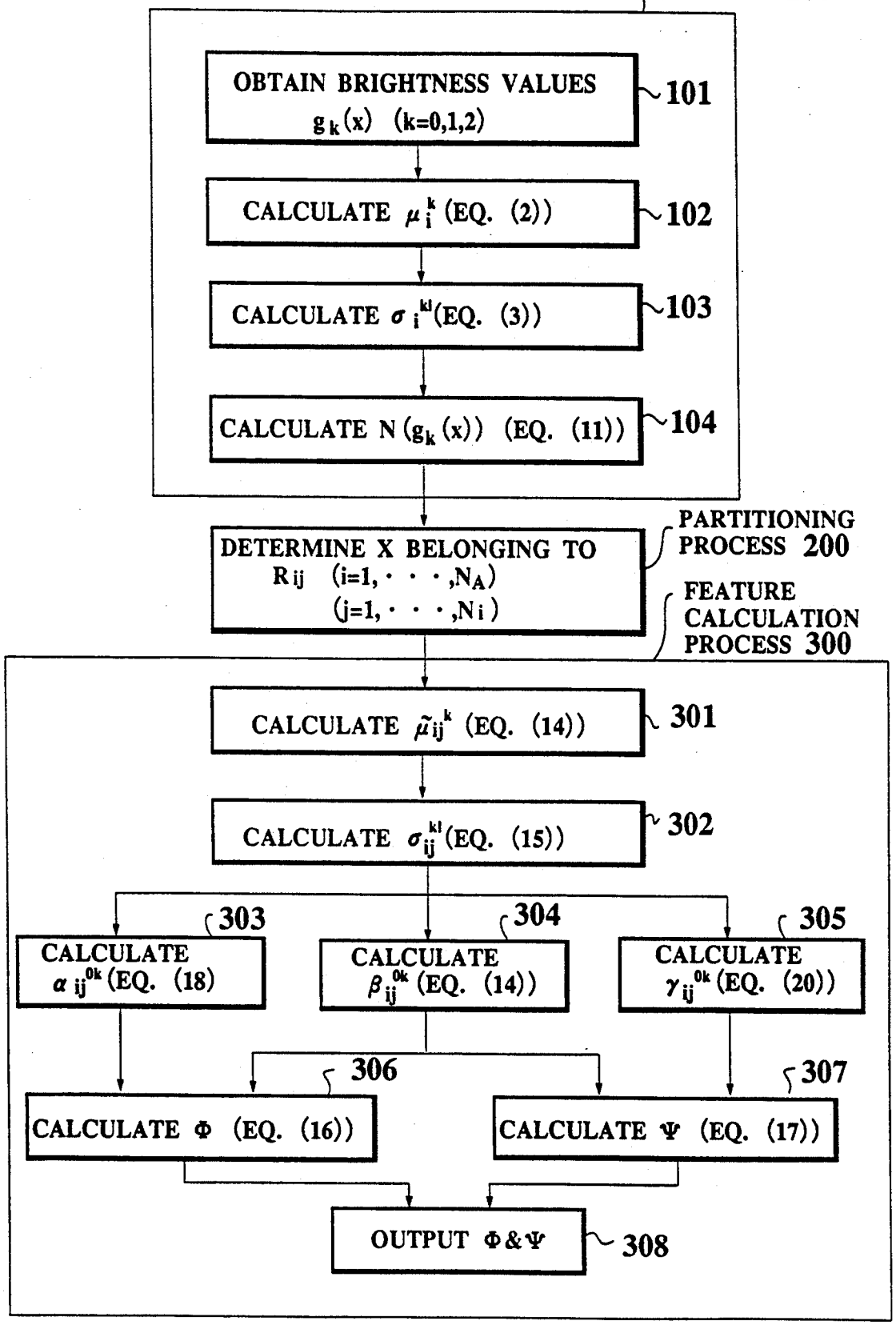
FIG. 5 is a flow chart for a calculational process to be carried out by a normalization unit, an area partition unit, and a feature calculation unit in the object detection system of FIG. 1.

Thus, the calculational steps involved in the operations at the normalization unit 6, area partition unit 9 and feature calculation unit 10 can be summarized as a flow chart shown in FIG. 5.

Namely, in the normalization process 100 at the normalization unit 6, the brightness $g_k(x)$, k=0, 1, 2 is obtained for each image at the step 101, then $\mu_i^k$ is calculated according to the equation (2) at the step 102, then $\sigma_i^{kl}$ is calculated according to the equation (3) at the step 103, and then $N(g_k(x))$ is calculated according to the equation (4) at the step 104.

Next, the positions x belonging to each $R_{ij}$, i=1, ..., $N_A$ and j=1, ..., $N_i$, are determined as the target area is partitioned in the partitioning process by the area partition unit 9 at the step 200.

Next, in the feature calculation process 300 at the feature calculation unit 10, $\tilde{\mu}_{ij}^k$ is calculated according to the equation (14) at the step 301, and $\tilde{\sigma}_{ij}^{kl}$ is calculated according to the equation (15) at the step 302. Then, $\alpha_{ij}^{0k}$ is calculated according to the equation (18) at the step 303, $\beta_{ij}^{0k}$ is calculated according to the equation (19) at the step 304, and $\gamma_{ij}^{0k}$ is calculated according to the equation (20) at the step 305. Then, $\Phi$ is calculated according to the equation (21) at the step 306, and $\Psi$ is calculated according to the equation (22) at the step 307, and finally the calculated normalized principal component features $\Phi$ and $\Psi$ are outputted at the step 308.

Now, in this object detection system, before the actual target images are to be processed in order to determine the presence or absence of the target object in the prescribed target areas at the classifier unit 13, the classifier to be used at the classifier unit 13 must be constructed at the classifier construction unit 12 by the training process as follows.

Namely, in the training process, first the object presence data indicating the already known presence or absence of the target object in the target areas in the training images stored in the training image memory 2 are inputted at the object presence data input unit 7 and stored in the object presence data memory 8, in order to be used as teacher data in the training process.

Then, on a basis of the object presence data stored in the object presence data memory 8 and the feature vector in the feature vector memory 11 obtained from the training image and the reference image in a manner described in detail above, the classifier construction unit 12 constructs the classifier to be used in the classifier unit 13 by applying a training algorithm usually used in a pattern recognition such as the Fisher's linear discrimination method, k-nearest neighbor method, stratified linear discrimination method, and neural network method, on the object presence data and the feature vector.

Here, the classifier is constructed by determining a manner of distinguishing the cases in which the target object is present from the cases in which the target object is absent in terms of the features. Namely, in an m-th dimensional feature vector space defined in terms of m features, a border between a region for the cases in which the target object is present and a region for the cases in which the target object is absent is determined by using the training sample data obtained from the training images, such that when the classifier is actually used, the presence or absence of the target object can be determined by looking at which one of these regions in the m-th dimensional feature vector space does a point defined by the values of the features belongs to.

After the classifier is constructed by this training process, the system is ready to carry out the actual object detection process for determining the presence or absence of the target object in the target areas of the actual target images.

Figure 6:
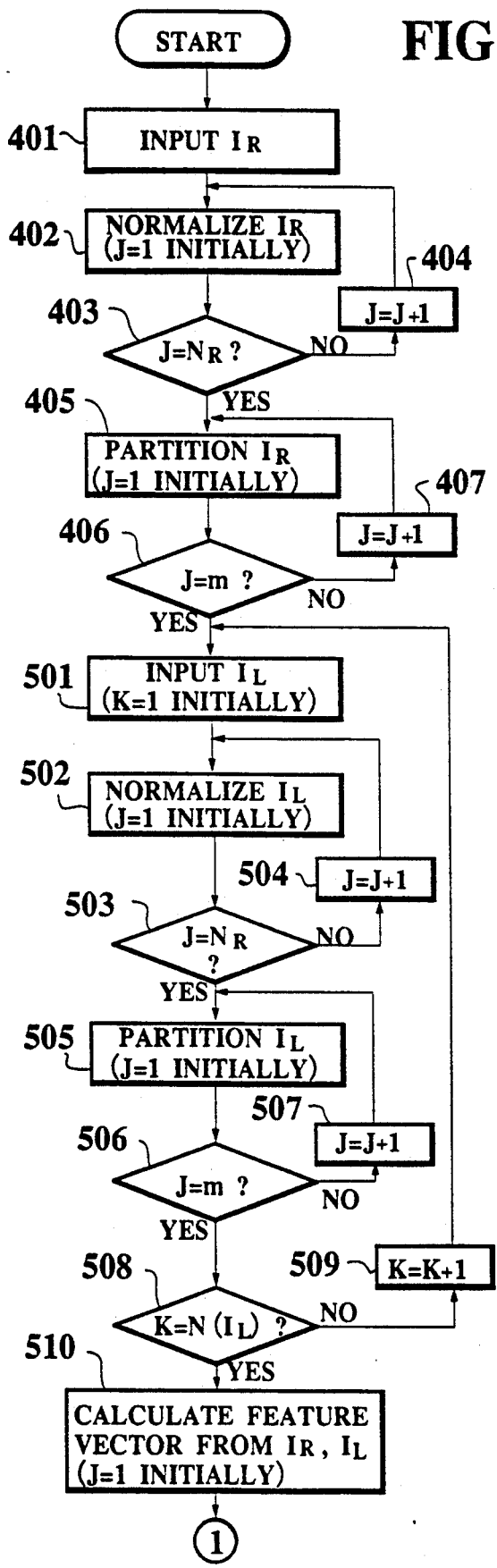
FIG. 6 is a flow chart for an overall operation of the object detection system of FIG. 1.
Figure 6:
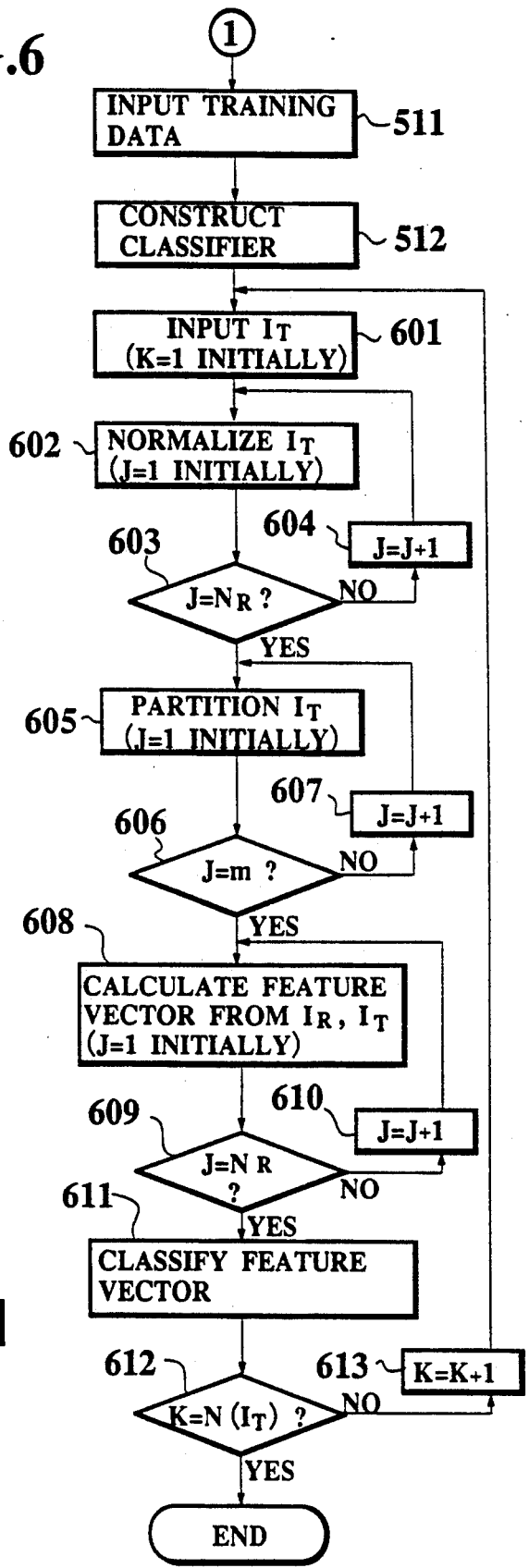

Thus, the entire operation of this object detection system is carried out according to the flow chart shown in FIG. 6, as follows.

First, at the step 401, the reference image $I_R$ is entered from the image input unit 1 to the reference image memory 3.

Then, at the step 402, the entered reference image $I_R$ is normalized at the normalization unit 6. This step 402 is repeated for each of $N_R$ target areas by the means of the steps 403 and 404, where $N_R$ is a total number of target areas in a single image.

Then, at the step 405, each target area of the normalized reference image $I_R$ is partitioned at the area partition unit 9. This step 405 is repeated for each of m partitions by means of the steps 406 and 407, where m is a total number of partitions in each target area.

Next, at the step 501, the training image $I_L$ is entered from the image input unit 1 to the training image memory 2.

Then, at the step 502, the entered training image $I_L$ is normalized at the normalization unit 6. This step 502 is repeated for each of $N_R$ target areas by the means of the steps 503 and 504.

Then, at the step 505, each target area of the normalized training image $I_L$ is partitioned at the area partition unit 9. This step 505 is repeated for each of m partitions by means of the steps 506 and 507.

These steps 501 to 507 are also repeated for each of $N(I_L)$ training images by means of the steps 508 and 509, where $N(I_L)$ is a total number of training images to be used.

Then, at the step 510, the feature vector is calculated from the partitioned and normalized reference image $I_R$ and each partitioned and normalized training image $I_L$ at the feature calculation unit 10 and the feature vector memory 11. This step 510 is repeated for each of $N_R$ target areas by means of the steps 511 and 512.

Then, at the step 513, the object presence data are generated at the object presence data generation unit 7 and stored in the object presence data memory 8 according to the training images stored in the training image memory 2 and the target area data stored in the target area data memory 5.

Then, at the step 514, the classifier is constructed by the classifier construction unit 12 by applying the training process to the object presence data stored in the object presence data memory 8 and the feature vector in the feature vector memory 11 obtained from the training images and the reference image, and stored in the classifier unit 13.

Next, at the step 601, the target image $I_T$ is entered from the image input unit 1 to the target image memory 4.

Then, at the step 602, the entered target image $I_T$ is normalized at the normalization unit 6. This step 602 is repeated for each of $N_R$ target areas by the means of the steps 603 and 604.

Then, at the step 605, each target area of the normalized target image $I_T$ is partitioned at the area partition unit 9. This step 605 is repeated for each of m partitions by means of the steps 606 and 607.

Then, at the step 608, the feature vector is calculated from the partitioned and normalized reference image $I_R$ and each partitioned and normalized target image $I_T$ at the feature calculation unit 10 and the feature vector memory 11. This step 608 is repeated for each of $N_R$ target areas by means of the steps 609 and 610.

Finally, at the step 611, the classification process is carried out by the classifier unit 13 with respect to the feature vector obtained from the reference image and target images in the feature vector memory 11, in order to obtain a classification result indicating the presence or absence of the target object in the target areas of the target image, and the obtained classification result is outputted by the result output unit 14 as the detection result obtained by the system.

These steps 601 to 611 are also repeated for each of $N(I_T)$ target images by means of the steps 612 and 613, where $N(I_T)$ is a total number of target images in which the presence or absence of the target object is to be determined by the system.

Now, a practical example for a case of detecting the presence of cars in a parking lot using this object detection system will be described with references to FIG. 7 to FIG. 10.

Figures 7, 8:
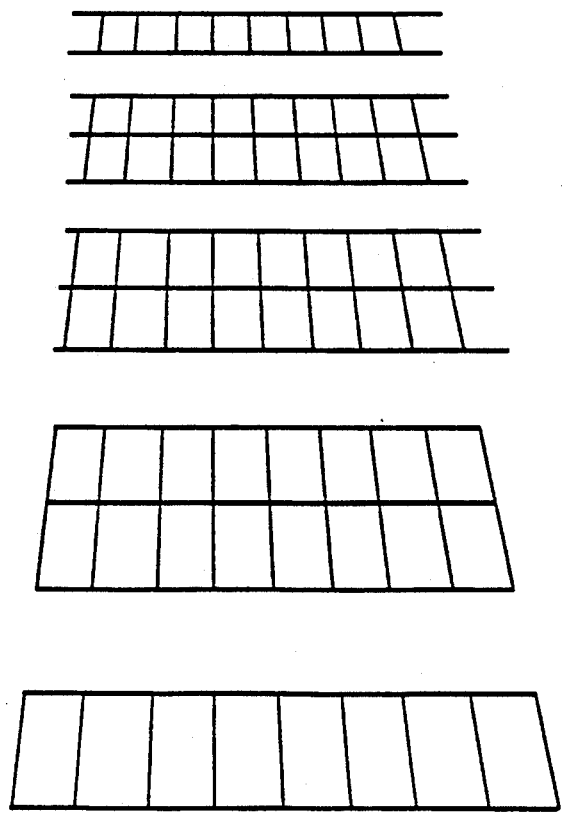
FIG. 7 is an illustration of parking spaces in a parking lot in which the presence of cars has been detected by the object detection system of FIG. 1 in a practical example of the application of the present invention.
FIG. 8 is an illustration of a reference image in the practical example of FIG. 7.

In this example, the presence of cars in the 64 parking spaces No. 0 to No. 63 in the parking lot shown in FIG. 7 is to be detected on a basis of the images taken from a fixed camera position. Thus, in this case, the target areas are the parking spaces No. 0 to No. 63, and there are 64 target areas in each image.

For this example, the reference image appears as shown in FIG. 8, in which no car is present in any one of the parking spaces No. 0 to No. 63, which is taken from the fixed camera position beforehand.

Figure 9:
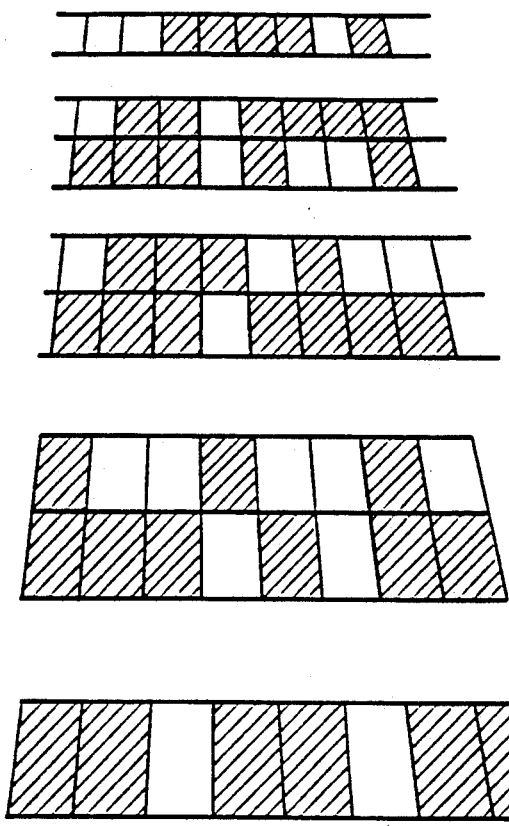
FIG. 9 is an illustration of a normalized target image in the practical example of FIG. 7.

Then, as the target images are taken from the fixed camera position, the target images are processed in the system as described in detail above. For example, after the normalization by the normalization unit 6, the normalized target image appears as shown in FIG. 9, in which the shaded regions indicate the darker sections in the target image, while the blank regions indicate the brighter sections in the target image.

Figure 10:
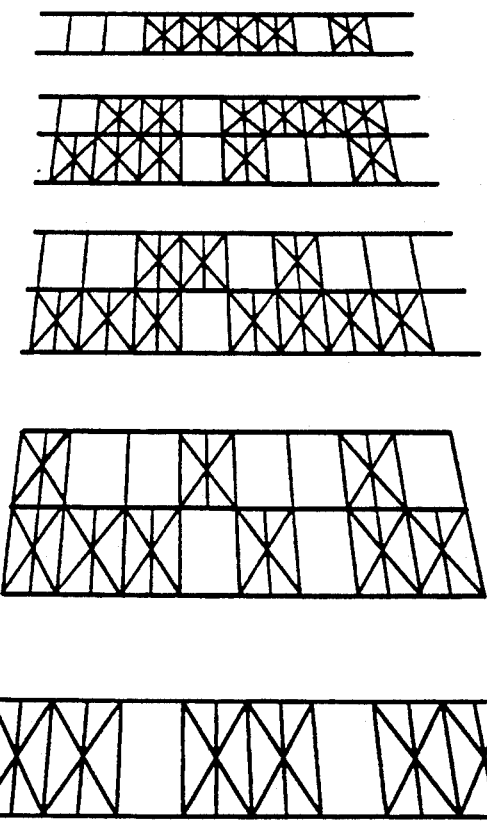
FIG. 10 is an illustration of a classification result obtained by the object detection system of FIG. 1 in the practical example of FIG. 7.

As a result of the classification operation at the classifier unit 13, the result shown in FIG. 10 can be obtained from the result output unit 14, in which the crossed out regions indicate the parking spaces in which the presence of the car is detected, while the blank regions indicate the parking spaces in which the absence of the car is detected.

In this example, the result shown in FIG. 10 is obtained by using the partition pattern shown in FIG. 2C at the partitioning process and the feature given by $\Phi^2 \times \Psi^2$ at the feature calculation process, along with the Fisher's linear discrimination method in the training process for training the classifier.

As described, according to this first embodiment, it is possible to provide a method and an apparatus for object detection capable of realizing the improved robustness because of the use of the normalized principal component features. In particular, the object detection system of this first embodiment possesses the robustness with respect to the following.

(1) The positions of the target areas.

(2) The irregular patterns on the background.

(3) The variation of the background state due to the environmental conditions such as weather.

(4) The variations of the brightness of the target object and the background due to the seasonal and temporal change of the position of the sun.

(5) The shadows due to the nearby buildings, clouds, and other objects obstructing the sunshine.

(6) The other objects located nearby the target object by which the view of the target object is partially obstructed.

(7) The small object other than the target object which is present in the target areas.

Moreover, the object detection system of this first embodiment is applicable to the target objects belonging to any specific category regardless of the exact shapes and colors of the target objects to be detected because of the use of the normalized principal component features which are not dependent on the specific characteristics of the target objects to be detected, so that it is possible to provide a method and an apparatus for object detection capable of realizing the general applicability.

Furthermore, the object detection system of this first embodiment is capable of carrying out the statistical learning in the training process as described above, so that it is possible to provide a method and an apparatus for object detection capable of realizing the customizability.

Figure 11:
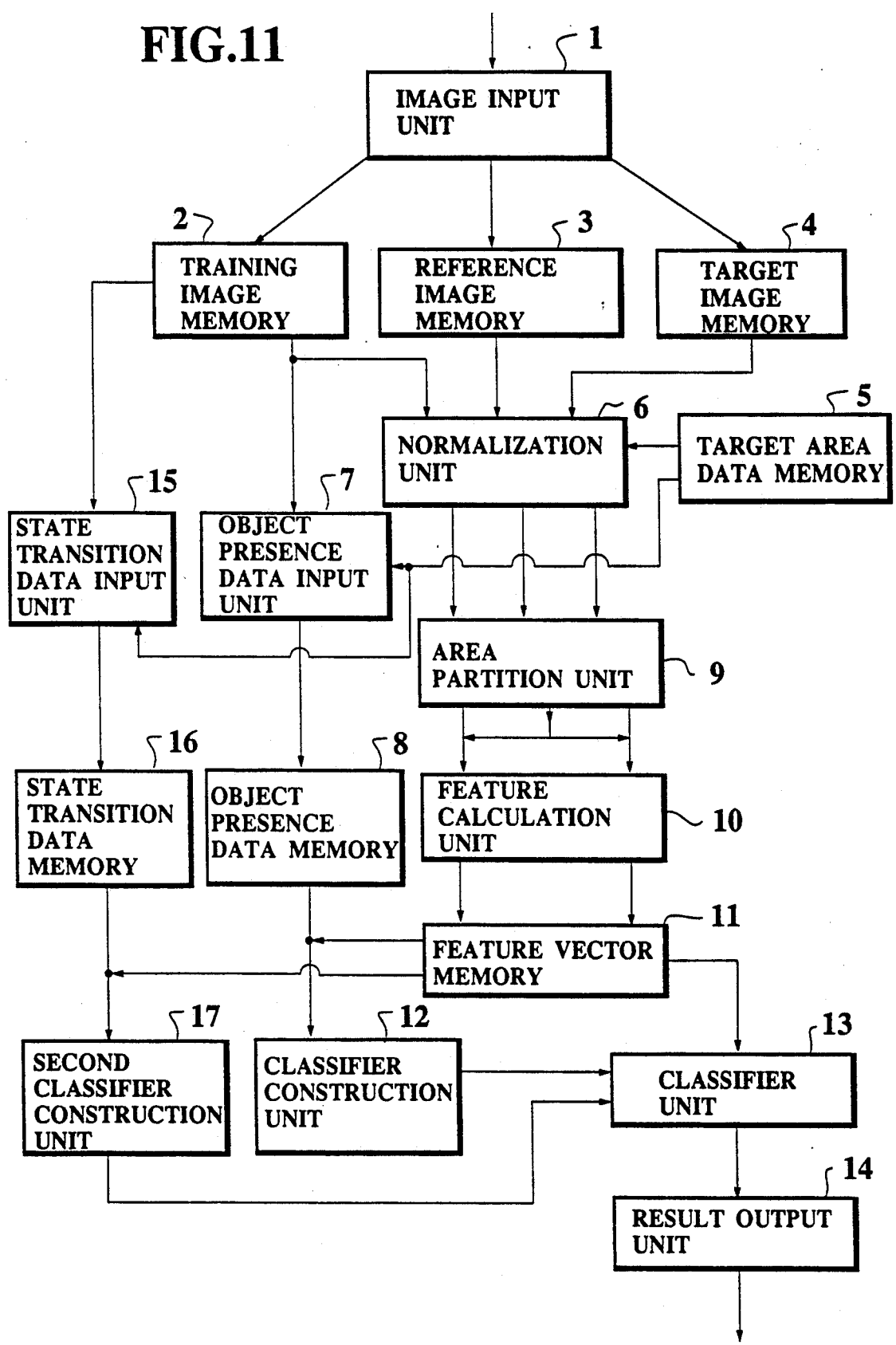
FIG. 11 is a block diagram of a second embodiment of an object detection system according to the present invention.

Referring now to FIG. 11, a second embodiment of an object detection system according to the present invention will be described in detail.

In this second embodiment, the system includes all the elements of the object detection system of FIG. 1 for which the same reference numerals are attached in the figure and the detailed description is omitted here. In this embodiment, the classifier constructed by the classifier construction unit 12 is referred to as the first classifier, and further comprises: a training state transition data input unit 15 for inputting state transition data indicating the already known occurrence of the state transition within the target areas in the sequential training images stored in the training image memory 2; a state transition data memory 16 for storing the inputted state transition data as teacher data for a training process; and a second classifier construction unit 17 for constructing a second classifier for classifying the occurrence and the absence of the state transition in the target areas by using the state transition data stored in the state transition data memory 16 and the feature vector in the feature vector memory 11 obtained from the training images and the reference image, where the classifier unit 13 stores and utilizes both the first classifier and the second classifier.

In this system, the second classifier construction unit 17 carries out the training process similar to that used by the classifier construction unit 12, with respect to two sequential training images.

In addition, in this system, the feature vector is also calculated for the two sequential target images between which the occurrence of the state transition is to be detected by the system.

Thus, in this object detection system, the presence or absence of the target object in each target area on each target image is detected by using the first classifier just as in the system of FIG. 1 described above, and in addition, the occurrence or absence of the state transition in each target area between two sequential target images is also detected by using the second classifier.

The result to be outputted from the result output unit 14 is determined according to the following expression:

$$S(t) = \begin{cases} S(t - \delta t) & \text{when } J_T(I_t, I_{t-\delta t}) = 0 \\ J_R(I_t, I_R) & \text{when } J_T(I_t, I_{t-\delta t}) = 1 \end{cases} \quad (31)$$

where, S(t) is a function indicating the presence or absence of the target object at a time t which is to be determined by the system, and which is to take a value 1 in a case the target object is detected, and a value 0 in a case the target object is not detected, $J_R$ is a function indicating the presence or absence of the target object at a time t which is determined by using the first classifier and which takes a value 1 when the target object is presence or a value 0 when the target object is absent, $I_R$ is a reference image, $I_t$ is a target image at the time t, $I_{t-\delta t}$ is a target image at a time immediately preceding the time t such that it is sequential to the target image $I_t$, and $J_T$ is a function indicating the occurrence or absence of the state transition at the time t which is determined by using the second classifier and which takes a value 1 when the state transition occurred or a value 0 when the state transition is absent.

Thus, the output S(t) outputted from the result output unit 14 in this system has the same value as the previous time $(t - \delta t)$ when the state transition is not detected, or the value indicated by the function $J_R$ when the state transition is detected.

Figure 12A:
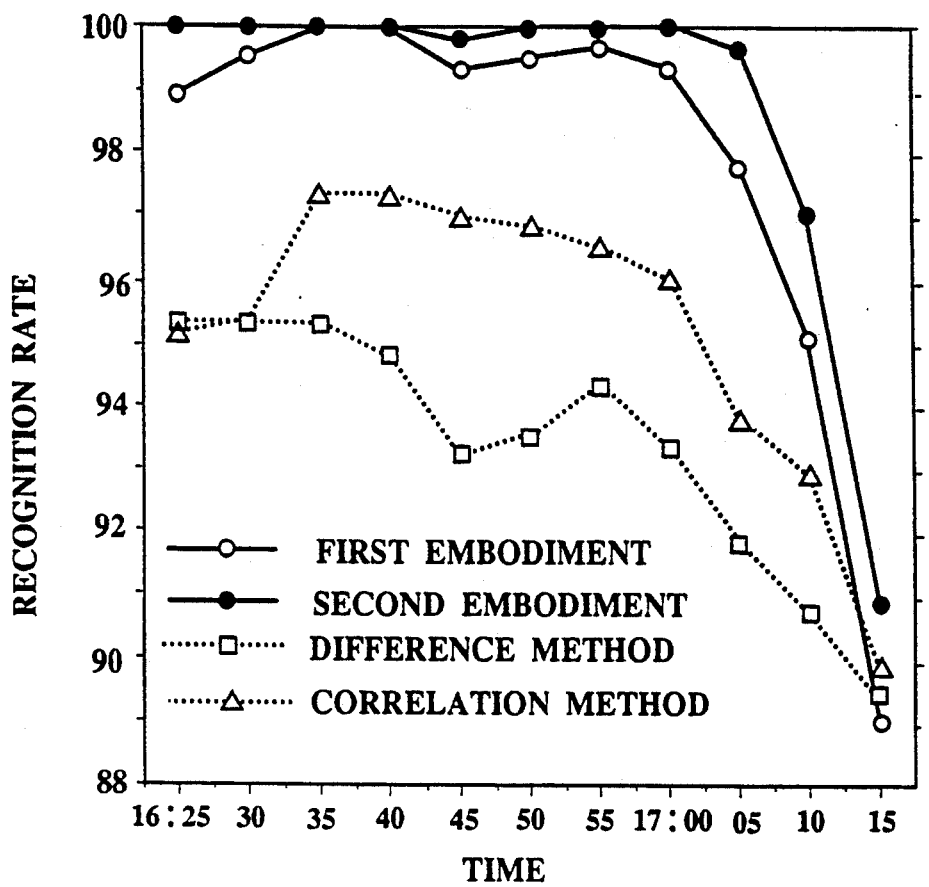
FIG. 12A is a graph of the recognition rate as a function of a time of a day, obtained by the experiments using the systems of FIG. 1 and FIG. 11, as well as the conventional systems.
Figure 12B:
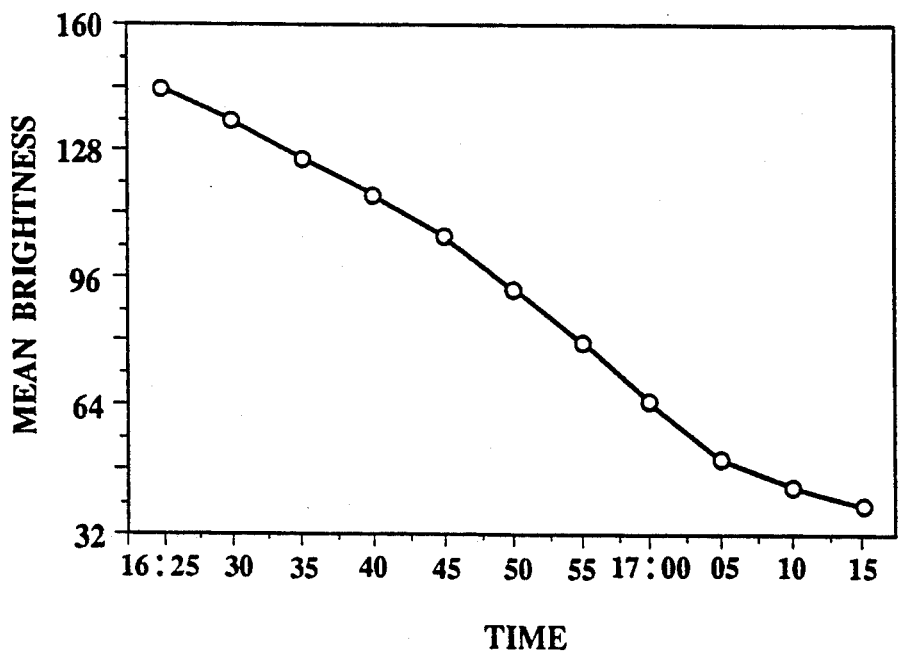
FIG. 12B is a graph of the mean brightness as a function of a time of a day under which the experimental results of FIG. 12A have been obtained.

The result concerning the recognition rate as a function of a time of a day has been obtained in the experiments using the system of FIG. 1, the system of FIG. 11, a conventional system using a difference method, and a conventional method using a correlation method, as shown in FIG. 12A, where these experimental results are obtained under the condition in which the mean brightness as a function of a time of a day varied as shown in FIG. 12B.

It can be seen from FIG. 12A that the system of FIG. 1 is capable of achieving much higher recognition rate than the conventional methods for the most time of the day, and the system of FIG. 11 is capable of achieving even higher recognition rate than the system of FIG. 1 in any time of a day. In particular, the system of FIG. 11 is capable of achieving the recognition rate significantly higher than that achieved by the system of FIG. 1 under very bright or dark environmental conditions.

In the object detection system of this second embodiment, the advantageous effects similar to that of the object detection system of FIG. 1, i.e., the robustness, general applicability, and customizability, can be achieved.

In addition, this object detection system is capable of achieving an even higher recognition rate than the object detection system of FIG. 1, especially in adverse circumstances such as those under the very bright or dark environmental conditions.

Moreover, this object detection system is capable of achieving even higher robustness than the object detection system of FIG. 1, with respect to the small object other than the target object which is present in the target areas.

Furthermore, in this object detection system, the requirement for the shortness of the time interval between the sequential target images for which the state transition is to be detected can be relaxed compared with the conventional state transition detection system.

It is to be noted that many modifications and variations of the above embodiments may be made without departing from the novel and advantageous features of the present invention. Accordingly, all such modifications and variation are intended to be included within the scope of the appended claims.

What is claimed is:

1. An object detection apparatus for detecting a presence of a target object in prescribed target areas on a target image taken from a fixed camera position, comprising:

camera means, located at said fixed camera position, for taking the target image, a reference image in which the target object is known to be absent, and training images taken in which the target object is known to be present;

feature calculation means for calculating features for the target image taken by the camera means, the features including at least one of a quantity expressing a difference of contributions by principal axis components and secondary axis components in a distribution of brightness of corresponding points in each target area on the target image and the reference image, and a quantity expressing a difference between a direction of a principal axis with respect to a vector (1, 1) direction in the distribution of brightness of corresponding points in each target area on the target image and the reference image;

training means for training a classifier to classify the features calculated by the feature calculation means into those corresponding to a presence of the target object and those corresponding to an absence of the target object, by applying a training process using the training images taken by the camera means;

classifier means for classifying the features calculated by the feature calculation means into a first class corresponding to a presence of the target object and a second class corresponding to an absence of the target object by using the classifier trained by the training means; and output means for outputting a detection result indicating the presence of the target object in the prescribed target areas on the target image taken by the camera means when the features for the target image calculated by the feature calculation means are classified into the first class by the classifier means, and the absence of the target object in the prescribed target areas on the target image taken by the camera means when the features for the target image calculated by the feature calculation means are classified into the second class by the classifier means.

2. The apparatus of claim 1, further comprising normalization means for normalizing brightness in each of the target image and the reference image, and wherein the feature calculation means calculates the features by using the target image and the reference image normalized by the normalization means.

3. The apparatus of claim 2, wherein the normalization means normalizes the brightness in each of the target image and the reference image such that a mean and a variance of the brightness in every target area of each of the target image and the reference image become uniform.

4. The apparatus of claim 1, further comprising partitioning means for dividing each target area on the target image and the reference image into a prescribed form of partitions, and wherein the feature calculation means calculates the features for each of the partitions.

5. The apparatus of claim 4, wherein the classifier means classifies the features in terms of a feature vector in which the features calculated by the feature calculation means for each of the partitions are arranged in a prescribed order assigned to the partitions.

6. The apparatus of claim 1, wherein the training means applies one of a Fisher's linear discrimination method, a k-nearest neighbor method, a neural network method, and a stratified linear discrimination method as the training process.

7. The apparatus of claim 1, wherein in the training process, the feature calculation means calculates the features for the training images, the features including at least one of a quantity expressing a difference of contributions by principal axis components and secondary axis components in a distribution of brightness of corresponding points in each target area on each of the training images and the reference image, and a quantity expressing a difference between a direction of a principal axis with respect to a vector (1, 1) direction in the distribution of brightness of corresponding points in each target area on each of the training images and the reference image, and the training means utilizes the features for the training images in training the classifier.

8. The apparatus of claim 1, wherein the feature calculation means also calculates features for sequential target images, the features includes at least one of a quantity expressing a difference of contributions by principal axis components and secondary axis components in a distribution of brightness of corresponding points in each target area on the sequential target images, and a quantity expressing a difference between a direction of a principal axis with respect to a vector (1, 1) direction in the distribution of brightness of corresponding points in each target area on the sequential target images; and which further comprises state transition classifier means for classifying the features for the sequential target images into a first class corresponding to an occurrence of a state transition between the sequential target images and and a second class corresponding to an absence of the state transition by using a state transition classifier.

9. The apparatus of claim 8, wherein the output means outputs the detection result indicating the presence of the target object and the absence of the target object according to a classification by the classifier means and a classification by the state transition classifier means.

10. The apparatus of claim 8, further comprising training means for training the state transition classifier used in the state transition classifier means by applying a training process using sequential training images taken from said fixed camera position in which the target object is known to be present.

11. The apparatus of claim 10, wherein the training means applies one of a Fisher's linear discrimination method, a k-nearest neighbor method, a neural network method, and a stratified linear discrimination method as the training process.

12. The apparatus of claim 10, wherein in the training process, the feature calculation means calculates the features for the sequential training images, the features including at least one of a quantity expressing a difference of contributions by principal axis components and secondary axis components in a distribution of brightness of corresponding points in each target area on the sequential training images, and a quantity expressing a difference between a direction of a principal axis with respect to a vector (1, 1) direction in the distribution of brightness of corresponding points in each target area on the sequential training images, and the training means utilizes the features for the sequential training images in training the state transition classifier.

13. A method for detecting a presence of a target object in prescribed target areas on a target image taken from a fixed camera position, comprising the steps of:

taking a reference image in which the target object is known to be absent from said fixed camera position;

taking the target image from said fixed camera position;

calculating features for the target image, the features including at least one of a quantity expressing a difference of contributions by principal axis components and secondary axis components in a distribution of brightness of corresponding points in each target area on the target image and the reference image, and a quantity expressing a difference between a direction of a principal axis with respect to a vector (1, 1) direction in the distribution of brightness of corresponding points in each target area on the target image and the reference image;

taking training images in which the target object is known to be present from said fixed camera position;

training a classifier to be used in classifying the features into those corresponding to a presence of the target object and those corresponding to an absence of the target object, by applying a training process using the training images to the classifier;

classifying the features into a first class corresponding to a presence of the target object and a second class corresponding to an absence of the target object by using the classifier trained at the training step; and outputting a detection result indicating the presence of the target object in the prescribed target areas on the target image when the features for the target image calculated at the calculating step are classified into the first class at the classifying step, and the absence of the target object in the prescribed target areas on the target image when the features for the target image calculated at the calculating step are classified into the second class at the classifying step.

14. The method of claim 13, further comprising the step of normalizing brightness in each of the target image and the reference image, and wherein at the calculating step the features are calculated by using the target image and the reference image normalized at the normalization step.

15. The method of claim 14, wherein at the normalizing step the brightness in each of the target image and the reference image is normalized such that a mean and a variance of the brightness in every target area of each of the target image and the reference image become uniform.

16. The method of claim 13, further comprising the step of dividing each target area of the target image and the reference image into a prescribed form of partitions, and wherein at the calculating step the features are calculated for each of the partitions.

17. The method of claim 16, wherein at the classifying step, the features are classified in terms of a feature vector in which the features calculated at the calculating step for each of the partitions are arranged in a prescribed order assigned to the partitions.

18. The method of claim 13, wherein at the training step, one of a Fisher's linear discrimination method, a k-nearest neighbor method, a neural network method, and a stratified linear discrimination method is applied to the classifier as the training process.

19. The method of claim 13, wherein at the training step, the features for the training images are calculated in the training process, the features including at least one of a quantity expressing a difference of contributions by principal axis components and secondary axis components in a distribution of brightness of corresponding points in each target area on each of the training images and the reference image, and a quantity expressing a difference between a direction of a principal axis with respect to a vector (1, 1) direction in the distribution of brightness of corresponding points in each target area on each of the training images and the reference image, and the features for the training images are utilized in the training process.

20. The method of claim 13, further comprising the steps of:

calculating features for sequential target images, the features including at least one of a quantity expressing a difference of contributions by principal axis components and secondary axis components in a distribution of brightness of corresponding points in each target area on the sequential target images, and a quantity expressing a difference between a direction of a principal axis with respect to a vector (1, 1) direction in the distribution of brightness of corresponding points in each target area on the sequential target images; and classifying the features for the sequential target images into a first class corresponding to an occurrence of a state transition between the sequential target images and a second class corresponding to an absence of the state transition by using a state transition classifier.

21. The method of claim 20, wherein at the outputting step the detection result indicating the presence of the target object is outputted according to a classification using the classifier means and a classification using the state transition classifier.

22. The method of claim 20, further comprising the steps of:

taking sequential training images in which the target object is known to be present, from said fixed camera position; and training the state transition classifier used at the step for classifying the features for the sequential target images by applying a training process using the sequential training images to the state transition classifier.

23. The method of claim 22, wherein at the training step, one of a Fisher's linear discrimination method, a k-nearest neighbor method, a neural network method, and a stratified linear discrimination method is applied to the state transition classifier as the training process.

24. The method of claim 22, wherein at the training step, the features for the sequential training images are calculated in the training process, the features including at least one of a quantity expressing a difference of contributions by principal axis components and secondary axis components in a distribution of brightness of corresponding points in each target area on the sequential training images, and a quantity expressing a difference between a direction of a principal axis with respect to a vector (1, 1) direction in the distribution of brightness of corresponding points in each target area on the sequential training images, and the features for the sequential training images are utilized in the training process.

* * * * *